Patented Oct. 22, 1929

1,733,071

UNITED STATES PATENT OFFICE

DONALD K. PATTILLO, OF FULTON, AND JAMES H. MacMAHON, OF NIAGARA FALLS, NEW YORK, ASSIGNORS, BY DIRECT AND MESNE ASSIGNMENTS, TO THE MATHIESON ALKALI WORKS, INC., OF NEW YORK, N. Y., A CORPORATION OF VIRGINIA

MANUFACTURE OF PAPER

No Drawing. Application filed January 12, 1928. Serial No. 246,374.

This invention relates to improvements in the operation of paper mills and the production of paper therein. More particularly, the invention relates to an improved process in which the slime problem is overcome or minimized.

The slime problem is one of the serious problems met with in paper mill operations. Our investigations of the slime problem indicate that slimes are due to bacterial action and that different classes of bacterial growth should be distinguished. Certain slimes are caused by bacterial growths or algæous growths in the water supply, while others are caused by various types of bacterial growths in the raw materials. Once slime formation has begun, from either or both of such causes, it may persist for long periods of time, since the slime tends to adhere to the different parts of the paper mill equipment through which the stock passes, and to contaminate and develop in the stock passing therethrough.

Moreover, where the white water is circulated and utilized in the mill, contaminated slime-containing white water will contaminate and inoculate additional stock of which it forms a part.

It has been proposed to treat the raw water entering a paper mill with chlorine in order to destroy algæous and similar growths, and thereby improve the operation of the paper mill; and, in some mills, where the slime is due to contamination from the raw water, such treatment may be effective in preventing or reducing the slime problem. Our investigations have indicated, however, that sterilization of the raw water is not effective in preventing and controlling slime formation where the raw materials employed are themselves contaminated. If sufficient chlorine is introduced into the raw water to sterilize the raw materials with which the raw water is admixed, an excessive amount of chlorine is required, which would be objectionable for other reasons. Our investigations indicate that slime-formation due to raw water and that due to raw materials are of such different natures that they require separate consideration and treatment. We have found, for example, in some cases, that only around 30% of the slime-formation was due to the raw water employed and that around 70% of the slime-formation was due to the raw materials, such as rag-stock, etc., employed.

The present invention provides an improved process in which the stock made from contaminated raw materials is subjected to sterilization with chlorine at an advanced stage of the paper making operation, that is, after the preliminary formation of the stock from the raw materials in the beater and after the beaten stock is on its way to the paper machine.

We have found that the sterilization of the stock can be advantageously effected after the beating operation, and after the stock has passed to the chests or mixing box and shortly before it is ready for the paper machine. We have found that the chlorine treatment of the stock can be carried out to particular advantage while the stock is in a state of high dilution before going to the paper machine. We have found that the stock can be advantageously chlorinated at this stage and effectively sterilized with a minimum consumption of chlorine and without attacking the fibres of the stock.

We have also found that the treatment of the stock with chlorine can advantageously be carried out as a two-stage operation in which the raw water is subjected to the action of chlorine with the use of a minimum amount of chlorine which will leave a small residual chlorine content in the raw water, and with treatment of the stock in the mill, while in a highly diluted state, prior to the paper making operation, with chlorine sufficient to leave a small residual chlorine content therein. Such a two-stage chlorine treatment of the raw water and of the diluted stock insures effective sterilization and removal of slime prior to the paper making operation and gives a paper which is sterile at the time of manufacture and a white water which is also sterile and which can be returned to the beater or to other parts of the mill without contaminating the stock or raw material with which it is admixed. Such chlorine treatment and sterilization presents other advantages, such as those hereinafter referred to.

In the operation of a paper mill, the raw material is added to the beater and mixed with water and subjected to the beating operation to convert it into what is commonly referred to as "half-stock". The stock from the beating operation may be subjected to further refining, in Jordans or other refining engines, and before or after a screening operation is diluted with water to low consistency, containing about 1% of fibres, and in such diluted state is passed to the paper machine where the sheet of fibres forms the sheet of paper, and from which the water drains away as white water. The white water may be recirculated for mixing with and diluting additional pulp prior to the paper making operation or it may be returned to the beaters for diluting additional raw material to form half-stock therewith. The white water is commonly passed through a save-all to remove as much as possible of the shorter fibres, etc., therefrom, and the white water which is not employed in the mill is commonly run to waste. In mills troubled with the slime problem, the discharge of white water removes from the mill the slime content contained therein, but, as hereinbefore pointed out, such removal does not solve the slime problem, particularly where a large amount of raw water is employed to replace the wasted white water, and where the raw materials employed are also themselves a prolific source of slime formation and where a part of the white water is recirculated in the system.

According to the present invention, the stock, subsequent to the beating and refining operations and while in a diluted state, is subjected to a regulated chlorine treatment to effectively sterilize the stock; and, in mills where the raw water supply is an objectionable source of slime formation, such chlorine treatment of the diluted stock is advantageously combined with chlorine treatment of the raw water supply, thus in effect utilizing a two-stage chlorine treatment of both the raw water supply and of the diluted stock. In this way, we are enabled to obtain effective chlorine treatment and sterilization with the utilization of a minimum quantity of chlorine, without attacking the fibres or the apparatus of the paper mill with the chlorine or chlorine water, and with resulting important advantages benefiting the paper making operations.

The chlorine employed for treating the raw water and the diluted stock, in the present process, may be gaseous chlorine introduced as such, or first combined with water to form chlorine water, and with introduction of the chlorine water into the raw water and into the diluted stock, or by using the chlorine in the form of a solution of hypo-chlorous acid or a hypo-chlorite. A particularly advantageous method of introducing the chlorine into the diluted stock, and into the raw water, is by combining the chlorine continuously in regulated amount with water and introducing the resulting chlorinated water into the stock.

The amount of chlorine required will vary with different stocks, but it should in general be sufficient to leave in the water of the treated stock a residual chlorine content, e. g., of around one-half part to one part per million of water. When raw water is chlorinated, it should similarly be treated with sufficient chlorine to leave such a small residual chlorine content in the water. We have found that the action of chlorine on the diluted pulp is almost instantaneous, and that, where sufficient chlorine is added to give such a residual chlorine content, this persists for some time. Larger amounts of chlorine are unnecessary, and, if too great, may attack the stock itself or the apparatus through which the stock is conveyed. The amount of chlorine required to give such a small but regulated content of residual chlorine can be readily determined for different stocks by simple tests, using the standard orthotolidine test, of the American Public Health Association.

Where the raw water is also treated with chlorine, the amount of chlorine required to leave a small content of residual chlorine in it can similarly be determined by simple tests.

The treatment of the fibre-water mixture or stock is particularly advantageous where the chlorine is added to the diluted stock passing through the mixing box ahead of the paper machine. At this point, the stock has been diluted to a fibre content of around 1%. The flow of the stock through the mixing box is sufficient to distribute the added chlorine water uniformly through it, and the action of the chlorine is sufficiently rapid so that it effects substantially instantaneous sterilization of the stock while the stock is flowing through the mixing box. In such a diluted stock containing only about 1% of fibres, the sterilization of the stock takes place readily without injury to the stock by the chlorine employed. Once the amount of chlorine required to treat the diluted stock and to leave therein a small residual chlorine content (e. g., from one-half part to one part per million) has been determined by preliminary tests, the proper amount of chlorine can readily be introduced, for example, by absorbing it in water to give chlorine water containing a regulated proportion of chlorine, and then introducing the chlorine water continuously and in regulated amounts to the flowing stream of diluted stock passing through the mixing box.

Where raw water is subsequently employed at the "showers", etc., it may also advantageously be subjected to the chlorine treatment to leave a similar proportion of residual chlorine therein.

This preliminary treatment of the stock, before the paper making operation, on the paper machine, effectively sterilizes the stock and destroys the slime, making the stock freer flowing on the paper machine, keeping the wires of the paper machine cleaner, keeping the felts cleaner, and giving a sterilized paper as well as a sterilized white water which may still contain a proportion of residual chlorine, e. g., between one-half part and one part per million.

In applying the present process to mills having an accumulation of slime from previous operations, a considerably increased amount of chlorine may be required to take care of such accumulation until the mill is brought to a condition where the amount of chlorine required is only that necessary to take care of current contaminations. Once the accumulation of slime which may exist in the mill is removed, further formation of slime can be prevented or minimized, with a minimum consumption of chlorine. The effective sterilization of the stock before it goes to the paper machine, and the production of both pulp and white water which are sterile or substantially so, enables the white water to be employed in place of raw water, for example, in the beaters and for diluting the stock, without introducing contamination. Slime contaminations which would otherwise be introduced by slime-contaminated white water are thus eliminated. The introduction of other slime through the raw water can be prevented through chlorine treatment of the raw water. Slime or pitch formation in the beaters is reduced or prevented by preventing contamination from the raw water and from the white water, leaving the raw material employed as the only source of contamination in the beaters and subsequent thereto; and, in most cases, the subsequent chlorine treatment of the diluted stock will take care of the slime problem which may result from the use of slime-forming raw materials in the paper mill.

The novel method of treating the stock with chlorine, according to the present invention, can be advantageously combined with coagulation of the stock before the paper making operation, as set forth in our companion application, Serial No. 242,283; as well as with the subsequent coagulation of the white water, after the paper making operation, as set forth in our companion application, Serial No. 242,159½; but the novel process of the present invention is of broader application and presents advantages when the stock is not subjected to coagulation before the paper making operation, and where the white water also is not subjected to coagulation. When neither the stock nor the white water is subjected to a coagulation treatment, the white water will contain a considerable amount of coagulable material. Such white water, if returned to the mixing box for diluting the stock in the further operation of the mill, or if returned to the beaters for mixing with the raw material, will carry with it the coagulable material, including short fibres, which pass through the screen in the paper making operation. Some of this material so returned in the white water will be recovered in subsequent operations. Such white water as is not returned to the mill and used in place of fresh water, may be passed through a save-all and subjected to a coagulating treatment before it is finally discharged from the mill as waste water.

It will thus be seen that the present invention provides an improved process for eliminating or decreasing the slime problem in mills employing contaminated raw materials which are themselves the source of slime formation. It will further be seen that slime deposits or slime formation due to putrefactive and pathogenic bacteria in the raw materials used, and which cannot be readily destroyed by sterilization of the raw water without excessive consumption of chlorine, can be readily destroyed, and slime eliminated, by a treatment of the stock subsequent to the beating operation and prior to the paper making operation, and particularly by a treatment of the diluted stock, containing only around 1% of fibres, immediately prior to the paper making operation on the paper machine. Such treatment may alone be sufficient, without treatment of the raw water; but in many cases the raw water can also be advantageously subjected to chlorine treatment, thus employing a two-stage chlorine treatment for insuring that the fibre-water mixture or stock flowing to the paper machine will be of a sterilized character, and giving white water which will also be of a sterilized character. The sterilized character of the pulp from which the paper is made gives a sterilized paper product which has improved keeping properties, and which is not subject to deterioration by contained slime constituents. These micro-organisms, which would otherwise deteriorate or decompose cellulose, are effectively destroyed by the chlorine treatment before the paper making operation.

The improved process of the present invention presents many advantages. The elimination of slime improves the paper making operation on the paper machine, gives the felts a longer life and keeps the felts and wires of the machine cleaner. A superior sterilized product is produced, free from slime contaminations. Less time is lost for shutting down and cleaning of the paper mill. The cleaner condition of the paper machine wires through the absence of slime permits the better formation of the paper web, increases the wire life, and decreases the amount of production time lost in necessary shut-down and cleaning of the wires. A white water which is not contaminated with slime is produced and can be advantageously employed in a closed system in place of fresh water for a large part of the mill operation; and other advantages are obtained in paper mill operations.

The present application is a continuation in part of an earlier application Serial No. 242,283, filed December 23, 1927.

We claim:—

1. The improvement in the operation of paper mills, which comprises treating the half-stock or fibre-water mixture, after its formation in the beaters and before the formation of paper therefrom, to treatment with chlorine to effect sterilization of the stock and to remove slime therefrom, and forming paper from the resulting stock.

2. The improvement in the operation of paper mills, which comprises subjecting the half-stock or fibre-water mixture from which the paper is to be produced to the action of chlorine by introducing chlorine therein after the production of the half-stock and while it is at a point of high dilution before it goes to the paper machine, and forming paper from the resulting treated stock.

3. The improvement in the operation of paper mills, which comprises subjecting the stock from which the paper is to be made to treatment with chlorine by adding chlorine thereto continuously as the diluted stock passes through the mixing box ahead of the paper machine.

4. The improvement in the operation of paper mills, which comprises subjecting the stock from which the paper is to be made, while it is at substantially its minimum fibre density and contains only around 1% or less of cellulose fibres (on a bone-dry basis) to the action of chlorine to effect sterilization of the stock without injuring the fibres.

5. The improvement in the operation of paper mills, which comprises subjecting the half-stock from which the paper is to be made, after its formation in the beater and before it passes to the paper machine, to treatment with chlorine in amount such that there remains in the treated stock a residual chlorine content of about one-half part to one part per million, and forming paper of the treated stock.

6. The improvement in the operation of paper mills, which comprises subjecting the raw water entering the mill to treatment with chlorine to leave therein a residual chlorine content of about one-half part to one part per million, and treating the fibre-water mixture or half-stock from which the paper is to be made, after the beating operation and while the half-stock is in a dilute state, to treatment with chlorine to leave therein a residual chlorine content of about one-half part to one part per million, and forming paper from the resulting stock.

7. The improvement in the operation of paper mills, which comprises subjecting the raw water entering the mill to treatment with chlorine, also treating the half-stock or fibre-water mixture, after the beating operation, and when it is at substantially its maximum dilution and contains only around 1% or so of fibre, to treatment with chlorine, and forming paper from the treated stock.

8. The improvement in the operation of paper mills, which comprises subjecting the half-stock or fibre-water mixture, while in a state of high dilution ahead of the paper machine, to treatment with chlorine sufficient to leave in the fibre-water mixture a residual chlorine content, of about one-half part to one part per million, forming paper from the treated stock, and returning the white water from such paper making operation for use in forming further amounts of half-stock for paper manufacture.

9. The improvement in the operation of paper mills, which comprises subjecting the raw water entering the mill to chlorine treatment, subjecting the half-stock or fibre-water mixture while in a state of high dilution ahead of the paper machine to chlorine treatment, forming paper from the treated stock and returning the white water from such paper making operation for use in forming additional half-stock in the further carrying out of the paper making operation.

10. The improvement in the operation of paper mills, which comprises adding continuously a stream of chlorine water to a flowing body of diluted half-stock or fibre-water mixture passing through the mixing box ahead of the paper machine, and forming paper from the resulting treated stock.

In testimony whereof we affix our signatures.

DONALD K. PATTILLO.
JAMES H. MacMAHON.